United States Patent [19]

Higgins

[11] 4,154,328

[45] May 15, 1979

[54] CENTRIFUGAL FLUID POWDER CLUTCH

[76] Inventor: Peter B. Higgins, White Oaks, Park Estate, St. Brelade, Jersey, Channel Islands, England

[21] Appl. No.: 766,019

[22] Filed: Feb. 7, 1977

[51] Int. Cl.² ............................................. F16D 37/00
[52] U.S. Cl. .................................. 192/105 A; 60/330; 188/268; 192/58 A
[58] Field of Search ........... 60/330; 192/105 A, 58 A; 188/268, 290, 296

[56] References Cited

U.S. PATENT DOCUMENTS

| | | | |
|---|---|---|---|
| 1,224,669 | 5/1917 | Rounds | 192/58 A |
| 1,910,142 | 5/1933 | Wemp | 192/58 A |
| 3,460,658 | 8/1969 | Badin | 192/105 A |
| 4,000,793 | 1/1977 | Chung | 192/105 A |

FOREIGN PATENT DOCUMENTS 205766  3/1956  Australia ..................................... 60/330

*Primary Examiner*—Benjamin W. Wych
*Attorney, Agent, or Firm*—Teare, Teare & Sammon

[57] ABSTRACT

A centrifugal clutch for mechanical transmission which includes a two-part casing and an internal rotor with a pseudo-fluid, material between the casing and rotor, wherein a face of the rotor opposite a face of the casing has a succession of grooves or waves which are substantially sinu-soidally shaped in a peripheral direction, and wherein each internal face of the casing has a succession of concave pockets, which are substantially egg-shaped, as formed by an internal section of an egg-shell cut lengthwise through the egg, with the wider end of the egg cut off to a radius which will conform to the inside diameter of the casing, and with the narrower end of the egg cut off to a radius which will conform to the outside diameter of an internal boss within the casing.

The two parts of the casing are joined together to form an annulus and the areas separating the pockets are chamfered adjacent the edges of the pockets and are flat or convex between the chamfered portions. The shape of the pockets enables the pseudo-fluid material to flow more readily from pocket-to-pocket and thereby to transfer heat from the material to the casing. To prevent racheting, there are an odd number of pockets in the casing and an even number of waves in the rotor or vice versa.

16 Claims, 9 Drawing Figures

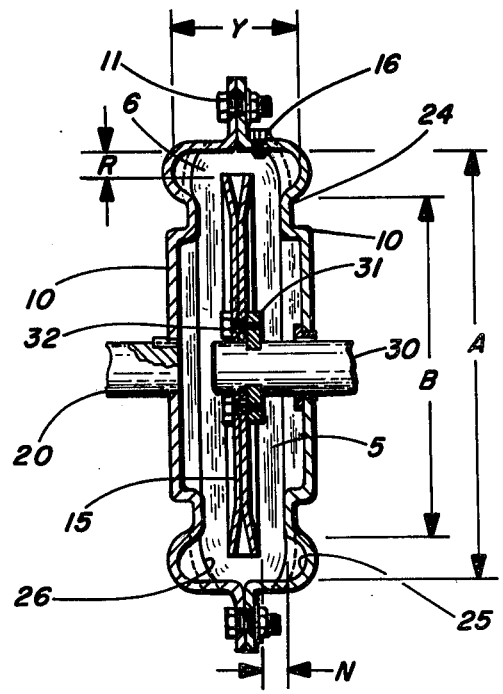
FIG. 1
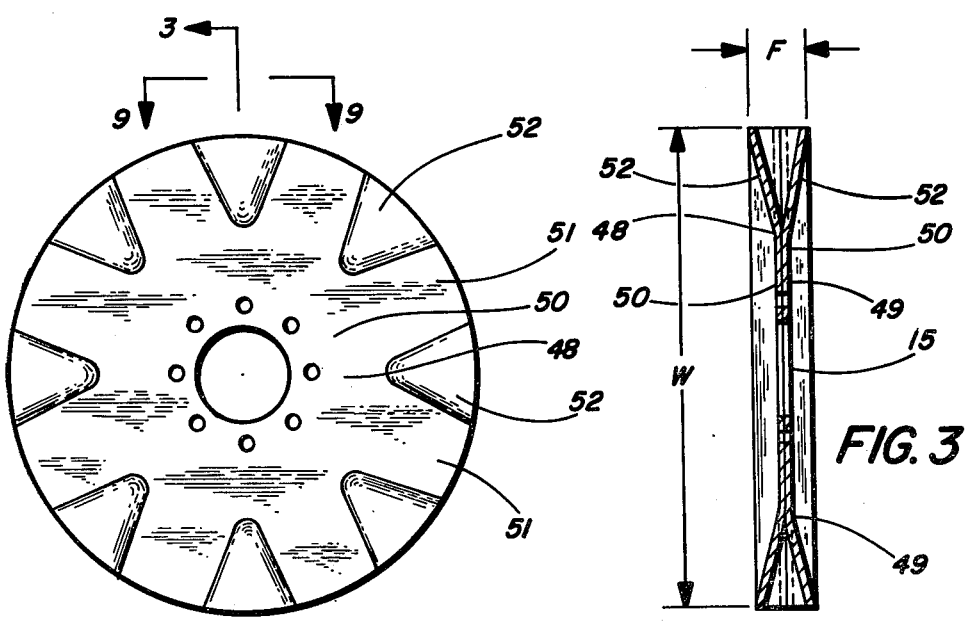
FIG. 2
FIG. 3
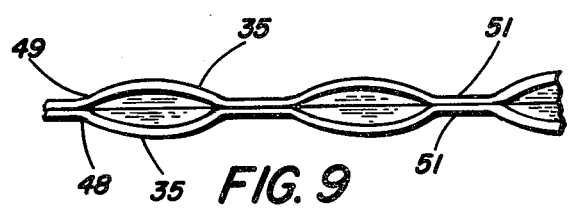
FIG. 9

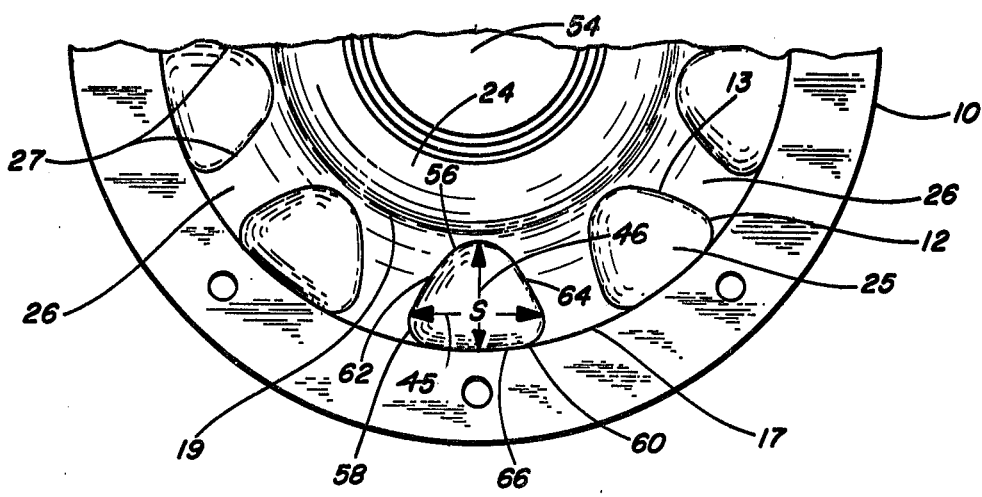
FIG. 4
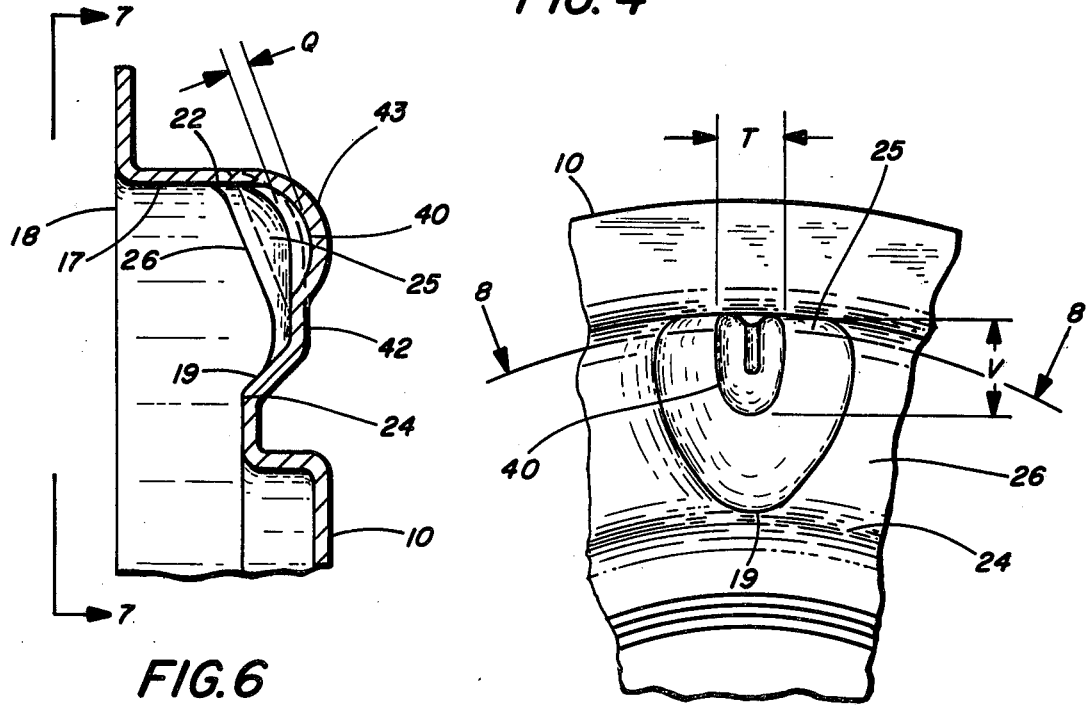
FIG. 6
FIG. 7
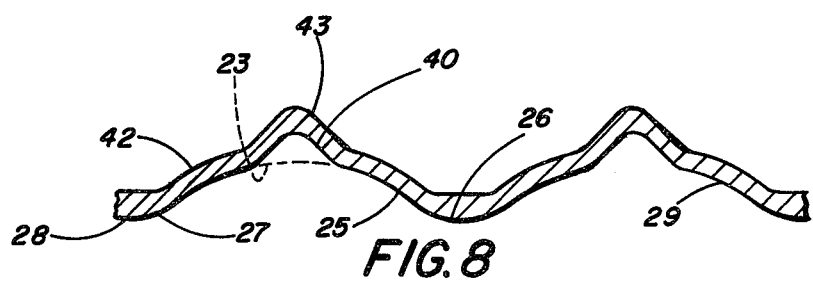
FIG. 8

CENTRIFUGAL FLUID POWDER CLUTCH

BACKGROUND OF THE INVENTION

The present invention relates to centrifugal clutches for transmitting a torque between a driving element and a driven element. Conventionally, these types of clutches employ a casing which encloses a rotor with a pseudo-fluid or granular material disposed therebetween. This material serves to provide the connection between the casing and the rotor. In operation, when the drive member is rotated, it drives the casing of the clutch and by reason of this drive tends to distribute the transmission element, (i.e., granular mass), to the periphery of the casing. By the effect of friction acting in the volumetric area between the rotor and the confronting surfaces of the casing, the rotor is rotated, due to the construction of the casing and rotor, and the circulation of the granular mass in the volumetric space between the rotor and casing. Accordingly, heat released by friction is directed toward the casing and is thereafter removed to the outside through fins provided on the casing.

Centrifugal clutches utilizing a granular or pseudo-fluid material between a rotor and casing have heretofore been in use, and one of such clutches is shown in U.S. Pat. No. 3,460,658, issued Aug. 12, 1969 for Centrifugal Fluid-Powder Clutch with Radial Grooves, but a problem in using such clutches has been the difficulty of dissipating the heat which is built up in the normal use of the clutch. Such heat results from movement under pressure of the pseudo-fluid material with reference to the casing and rotor, and such movement is dependent upon the shape of the grooves in the rotor and casing respectively. The structure in the aforesaid U.S. Pat. No. 3,460,658 utilizes fan shaped grooves in the rotor with similarly shaped grooves in the casing, but such shape of grooves restricted the flow of material, limited the volume of pseudo-fluid material which could be used in the casing to about 75% of the volume of the casing and did not allow prolonged slipping to take place, because the heat released by friction between the material and the casing could not be dissipated. Moreover, such differences in volume results in less power transmitted and an increase in the breakaway torque.

SUMMARY OF THE INVENTION

The invention of the present application enables the volume of pseudo-fluid material to be increased to about 90% of the casing, over that shown in U.S. Pat. No. 3,460,658 thereby increasing the power transmitted for a given size unit and diminishing the breakaway torque. This is accomplished by forming waves which are substantially sinusoidal in shape in a peripheral direction in the rotor, and by forming casing pockets which are substantially egg-shaped, as formed by an internal section of an egg-shell, which is cut lengthwise through the egg, with the wider end of the egg cut off to a radius which conforms to the inside diameter of the casing, and with the narrow end of the egg cut off to a radius which conforms to the outside diameter of an internal boss on the casing.

The two parts of the casing are joined together to form an annulus, and the areas separating the pockets are chamfered adjacent the edges of the pockets and are flat or convex between the chamfered portions. To prevent racheting, there are preferably an odd number of pockets in the casing and an even number of waves in the rotor, or vice versa.

The pockets in the casing increase the normal volume of the casing, but the volume may be further increased by the formation of depressions which extend radially along the median lines of the respective pockets. Each depression may be substantially V-shaped in form in a peripheral direction thereby resulting in protuberances on the outer wall of the casing which extend radially and provide fins which, upon rotation of the casing, serve to dissipate the heat which is developed in the operation of the clutch. The walls of the pockets and the walls of the depressions merge so as to provide a smooth surface for the travel of the pseudo-fluid material between the rotor and the casing during the operation of the clutch.

An advantage of the present invention is that the heat developed as a result of prolonged slipping can be dissipated without a prohibitive rise in the operating temperature. Because of the capacity to slip without danger of destruction the clutch of the present invention can function as a powerful and progressive brake. It can also function as a torque limiter and as a torque vibration filter.

BRIEF DESCRIPTION OF THE DRAWINGS

In the drawings:

FIG. 1 is a vertical section through a pseudo-fluid clutch embodying one form of the invention;

FIG. 2 is a front elevation view of the rotor removed from the assembly;

FIG. 3 is a section taken on a plane indicated by the line 3—3 in FIG. 2;

FIG. 4 is an elongated fragmentary front elevation view of the interior of the casing removed from the assembly;

FIG. 6 is a fragmentary vertical section through a part of the casing having a modified pocket formation on a scale larger than FIG. 4.

FIG. 7 is a fragmentary front elevation view of the interior of the casing as viewed on the line 7—7 of FIG. 6;

FIG. 8 is a developed enlarged sectional view of a portion of the casing shown in FIGS. 6 and 7 taken along the line 8—8 in FIG. 7; and FIG. 9 is a fragmentary end view of the rotor as viewed on the line 9—9 of FIG. 2.

DESCRIPTION OF THE PREFERRED EMBODIMENT

Figure 5:
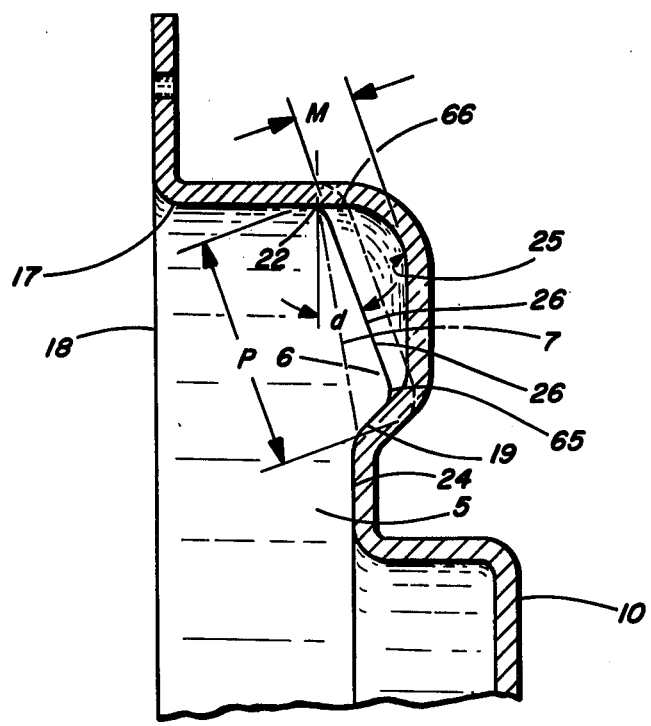
FIG. 5 is a fragmentary vertical section through a part of the casing, on a scale larger than that of FIG. 1.

The embodiment shown in FIG. 1 illustrates a casing which contains two side members 10 which are adapted to be connected together as by bolts 11. The members can be cast or produced by stamping, and when assembled they comprise an annulus designated generally as 5 within which a rotor 15 is mounted for rotation between the side members. The cast form is shown in FIGS. 1 and 4, and the stamped form is shown in FIGS. 6 and 7. One of the side members is provided with a filling stopper 16 for the insertion of pseudo-fluid material. Such material is preferably a hard powdered shot metal, such as stainless steel or chilled iron, having a diameter less than 2 mm.

The casing is shown in FIGS. 1 and 4 as being rigidly connected to a drive shaft 20 as having in each inner face a succession of concave pockets 25, which are separated by areas 26. Such areas form part of the inner casing wall, and are preferably chamfered as at 27, adjacent the radial edges of the pockets and are preferably slightly convex in form, as at 28 (FIG. 8) in the space between the chamfered portions. The walls of the pockets extend radially outwardly from an internal annular boss 24 in the casing to the internal wall 17 of the casing and are curved radially and peripherally of the casing.

In accordance with the invention, and referring particularly to FIGS. 2, 4, 6 and 8, reference is made to the structural configuration of the pockets 25 for maximizing the volumetric capacity of the transmission media while maintaining sufficient heat transfer characteristics for dissipating the heat developed during operation of the clutch. Such construction enables the transmission media to occupy up to 90% of the volumetric capacity of the space between the confronting interior surfaces of the casing and rotor, respectively.

As best seen in FIG. 4, the pockets 25 have the general configuration of ½ of an ellipse, and preferably, such configuration, as viewed in FIG. 4 is of a truncated oblate configuration. The configuration is ½ of a full oblate, double curved surface. As shown, such oblate configuration is defined by a major axis 45, and a minor axis 46 disposed perpendicularly to each other. The major axis 45 is disposed perpendicularly to the casing axis 54, while the minor axis 46 extends radially with respect thereto. For a casing having an internal diameter of 175 mm, it is preferred that the major axis be 33 mm approximately, and that the minor axis be 30 mm approximately. A shown in FIG. 4, the pocket configuration is defined by a rounded inner end 56 and a pair of outer rounded ends 58 and 60, which merge smoothly into sides 62 and 64 and an outer base 66. Such surfaces together define the oblate configuration shown. Preferably, the major and minor axis of such configuration have a preferred length ratio of about 1.4 to 1.

The pockets having the foregoing proportions occupy between 60% and 90% of the total surface area of that portion 6 of the annulus 5 lying radially and axially outwardly of the dot and dash line 7 in FIG. 5, and the wall portions 26 between the pockets occupy the remaining area.

As best seen in FIG. 5, the pockets 25 have a generally right triangular configuration in vertical section taken along the plane of the minor axis 45. In general, the pockets are disposed at an angle "d" of approximately 20 degrees with respect to the generally vertical plane of the casing. The deepest part of each pocket indicated at M in FIG. 5 is between 12% and 40% of the length of the pocket indicated at P in FIG. 5, measured radially and is also between 12% and 40% of the widest part of the pocket as indicated at S in FIG. 4, measured peripherally. Additionally, the deepest part of each pocket is about 6% of the rotor diameter.

As shown in the developed surface section of FIG. 8, the pockets of FIG. 4 and 5 have a generally circular concave shape as at 29 and along the broken line 23, when taken in transverse cross-section along the major axis 45, and when viewed from the interior of the casing. Such circular concavity extends throughout the radial extent of the pocket.

Although the overall peripheral portion of each pocket has been described as partially oblate or as substantially triangular, when viewed from the interior of the casing as in FIG. 4, nonetheless the segments, such as 62 and 64, of the peripheral portions, which extend between the inside wall 17 of the casing and the outside diameter 19 of the boss 24 might also be termed substantially egg-shaped, as formed by an internal section of a chicken's egg shell which is cut lengthwise through the egg, with the wider end 12 of the egg cut off to a radius which conforms to the inside diameter wall 17 of the casing, and with the narrow end 13 of the egg cut off to a radius which conforms to the outside diameter 19 of the internal boss 24.

Where the casing side members are cast or molded, the walls of the pockets are smooth and are curved both axially and peripherally. The molded or cast form is generally used on clutches of relatively larger size and higher power transmission. On clutches of relatively smaller size, however, the side members may comprise metallic stampings and, if desired, may have depressions 40, as in FIGS. 6 and 7, which are shown in full lines as V-shaped in FIG. 8, and which have their deepest part on the radial median line of the respective pockets. The walls of the depressions project outwardly from the outer walls 42 of the sidemembers and thereby provide fins 43 on the exterior portion of the casing. The fins increase the fan effect and result in increased dissipation of heat during the operation of the clutch. Such fins, for the cast or molded form of casing side members are formed on the exterior faces of the members and may be solid or rib-like in formation.

The uncertainty of the action of the power transmitting material in a pseudo-fluid clutch makes it difficult, if not impossible, to forecast the relationship which should exist between the formation and the spacing of the driving and driven members of the clutch in order to obtain maximum transmission of power and dissipation of heat. It has been determined, however, in developing the present invention, that factors which affect the torque and the breakaway are (a) that the width of the rotor at the periphery should be between 7½% and 15% of the rotor diameter, (b) that the clearance between the rotor diameter and the inside diameter of the casing should be between 2% and 7% of the rotor diameter, and (c) that the clearance as measured axially of the clutch between the nearest part of the rotor tip and the surface of the space between the casing pockets should be between 3% and 7% of the rotor diameter. In FIG. 3, the width of the rotor identified in the foregoing factor (a) is designated F. In FIG. 1, the clearance designated in the foregoing factor (b) is indicated at R, and the clearance designated in factor (c) is indicated at N.

An example of a fluid-powder clutch embodying the invention of this application, and which has been operated in a satisfactory manner has the following dimensions:

| | |
|---|---|
| Internal diameter A of the casing, FIG. 1 | 175 mm |
| Outer diameter B of internal boss, FIG. 1 | 120 mm |
| Depth M of casing pocket, FIG. 5 | 10 mm |
| Radial length P of casing pocket, FIG. 5 | 30 mm |
| Width S of casing pocket, FIG. 4 | 33 mm |
| Distance N axially between rotor tip and nearest surface of space between pockets, FIG. 1 | 9 mm |
| Depth Q of fin depression, FIG. 6 | 5 mm |
| Radial length V of fin depression, FIG. 7 | 13 mm |
| Width T of fin depression, FIG. 7 | 10 mm |
| Rotor diameter W, FIG. 3 | 166 mm |
| Rotor width F, FIG. 3 | 14 ± 0.5 mm |
| Distance Y axially between deepest parts of opposing pockets in the casing, FIG. 1 | 40 ± 1 mm |

The foregoing is exemplary of one size of fluid powder clutch.

The rotor is shown in FIGS. 2 and 3 as comprising discs 48 and 49, each of which has a flat central portion 50 and co-planar spoke-like portions 51 regularly spaced and extending radially outwardly from the central portion. Each disc has outwardly curved portions 52 between the portions 51, and when the discs are fastened together, as shown in FIG. 1, the curved portions 52 are opposite each other, thus providing an external substantially sinusoidal peripheral shape on each side of the rotor as best shown in FIG. 9. Such shape aids materially in achieving the desired action in the movement of the pseudo-fluid material during the operation of the clutch.

From the foregoing, it will be seen that the present invention provides a novel and improved construction and functional configuration of the pockets and the lands which conjointly interact to maximize the output efficiency of the clutch while effectively dissipating heat effects. As viewed in FIG. 4, peripherally the pockets are substantially of an oblate configuration, in front elevation, defined by a continuous peripheral inner edge surface formed by the adjacent lands and by the boss 24 and the wall 17 of the casing. In the vertical cross-section of FIG. 5, the general plane of the pocket separation areas 26 is disposed at an angle (d) to the vertical, so that each pocket may be said to be disposed at an acute anble with respect to the confronting surface of the rotor. In transverse cross section (FIG. 8) the pockets have a concave configuration 29 which progressively diminishes in width along the minor axis 46 toward the axis 54 of the casing.

In operation, after assembly of the rotor within the casing, the pseudo-fluid material is inserted into the space within the casing, through the fill-opening until the desired amount is introduced. When the rotative power is applied to the casing, and the rotor is connected to a load, centrifugal force tends to distribute the pseudo-fluid material to the periphery of the casing, and by the effect of friction acting in the main in the narrowed spaces between the edges of the pockets in the casing and the grooves in the rotor, the rotor is rotated. The frictional effect continues until the speed ratio of the casing to the rotor is approximately 1 to 1. A slight slippage of about 0.05% is desired, but it may be as low as 5 turns per 10,000 r.p.m. Upon reduction of speed, or release of the load, if the pressure acting on the material is not released, the material will tend to heat rapidly and unless dissipated, will damage the components of the assembly. At such time, the shape of the pockets of the present invention allows the material to flow from one pocket to another progressively and sufficiently to move the heat toward the wall of the casing, where it is removed to the outside through the body of the casing and the fins on the casing.

I claim:

1. A centrifugal clutch for mechanical transmission by means of powdered shot, or pseudo-fluid material, which is contained between opposing pockets in an enclosing casing and grooves in a rotor which is mounted for rotation within the casing, wherein the improvement comprises, the pockets have their peripheral portions substantially egg-shaped, and have their greatest width disposed adjacent the outer ends of the pockets, said greatest width of each pocket being greater than its radial dimension and the material is flowable between the pockets during rotation so as to transfer heat from the rotor through the casing.

2. A centrigual clutch for mechanical transmission by means of powerered shot, or pseudo-fluid material, which is contained between opposing pockets in an enclosing casing and grooves in a rotor which is mounted for rotation within the casing, wherein the improvement comprises, the pockets have their peripheral portions substantially egg-shaped, and have their greatest width disposed adjacent the outer ends of the pockets, and the material is flowable between the pockets during rotation so as to transfer heat from the rotor through the casing, and each pocket in the casing has a depression extending along the radial median line thereof.

3. A centrifugal clutch according to claim 2 wherein, the depressions form fins which extend radially of the outer wall of the casing.

4. A centrifugal clutch according to claim 2, wherein the inner surface of each depression is concave in the deepest part of the depression and is convex where the depression merges with the bottom of the pocket.

5. A centrifugal clutch for mechanical transmission by means of powdered shot, or pseudo-fluid material, which is contained between opposing pockets in an enclosing casing and grooves in a rotor which is mounted for rotation within the casing, wherein the improvement comprises, the pockets have their peripheral portions substantially egg-shaped, and have their greatest width disposed adjacent the outer ends of the pockets, and the material is flowable between the pockets during rotation so as to transfer heat from the rotor through the casing, the rotor comprising two discs which are fastened together and each of which has a flat central portion and co-planar spoke-like portions regularly spaced and extending radially outwardly from the central portion and each of which has curved portions between the spoke-like portions.

6. A centrifugal clutch according to claim 5, wherein the curved portions on the respective discs are disposed opposite each other in the assembly.

7. A centrifugal clutch for mechanical transmission by means of powdered shot, or pseudo-fluid material, which is contained between opposing pockets in an enclosing casing and grooves in a rotor which is mounted for rotation within the casing, wherein the improvement comprises, the pockets have their peripheral portions substantially formed of curved sides and curved ends with the greatest width between the sides disposed adjacent the outer ends of the pockets, and the material is flowable between the pockets during rotation so as to transfer heat from the rotor through the casing.

8. A centrifugal clutch according to claim 7 wherein, the interior of the casing is an annulus, and the pockets occupy between 60% and 90% of the total surface area of the annulus in the casing.

9. A centrifugal clutch according to claim 7 wherein, the deepest part of each pocket is between 4% and 6% of the rotor diameter.

10. A centrifugal clutch according to claim 7, wherein
the deepest part of each pocket is between 12% and 40% of the width of the pocket, measured radially and is also between 12% and 40% of the width of the pocket measured peripherally.

11. A centrifugal clutch according to claim 7, wherein
the width of the rotor at the periphery is between 5% and 15% of the rotor diameter.

12. A centrifugal clutch according to claim 7, wherein
the clearance between the rotor diameter and the inside diameter of the casing is between 2% and 7% of the rotor diameter.

13. A centrifugal clutch according to claim 7, wherein
the nearest part of the rotor tip and the surface of the space between the casing pockets is between 3% and 7% of the rotor diameter.

14. A centrifugal clutch according to claim 7, wherein
the areas which separate the pockets are chamfered at the edges of the pockets and are substantially flat in a peripheral direction in the space between the chamfered portions.

15. A centrifugal clutch according to claim 7, wherein
the casing comprises two members which are fastened together, to form an annulus and each member has an internal annular boss and wherein,
the outer ends of the pockets extend to the inner diameter of the casing and the inner ends of the pockets extend to the outside diameter of the internal boss.

16. A centrifugal clutch for mechanical transmission by means of powdered shot, or pseudo-fluid material, which is contained between opposing pockets in an enclosing casing and grooves in a rotor which is mounted for rotation within the casing, wherein the improvement comprises,
substantially the entire peripheral portions of the pockets are curved,
the pockets define major and minor axes,
the minor axis extends from the outer end of the pocket to the inner end, and is generally radially disposed relative to the central axis of the casing,
the span between the peripheral portions of the pockets in a direction perpendicular to the minor axis is unequal, with the greatest span being disposed adjacent the outer end of the pocket and the least span being disposed adjacent the inner end thereof,
whereby the clutch is adapted for the material to be flowable between the pockets during rotation so as to transfer heat from the rotor through the casing.

* * * * *